United States Patent Office 3,211,627
Patented Oct. 12, 1965

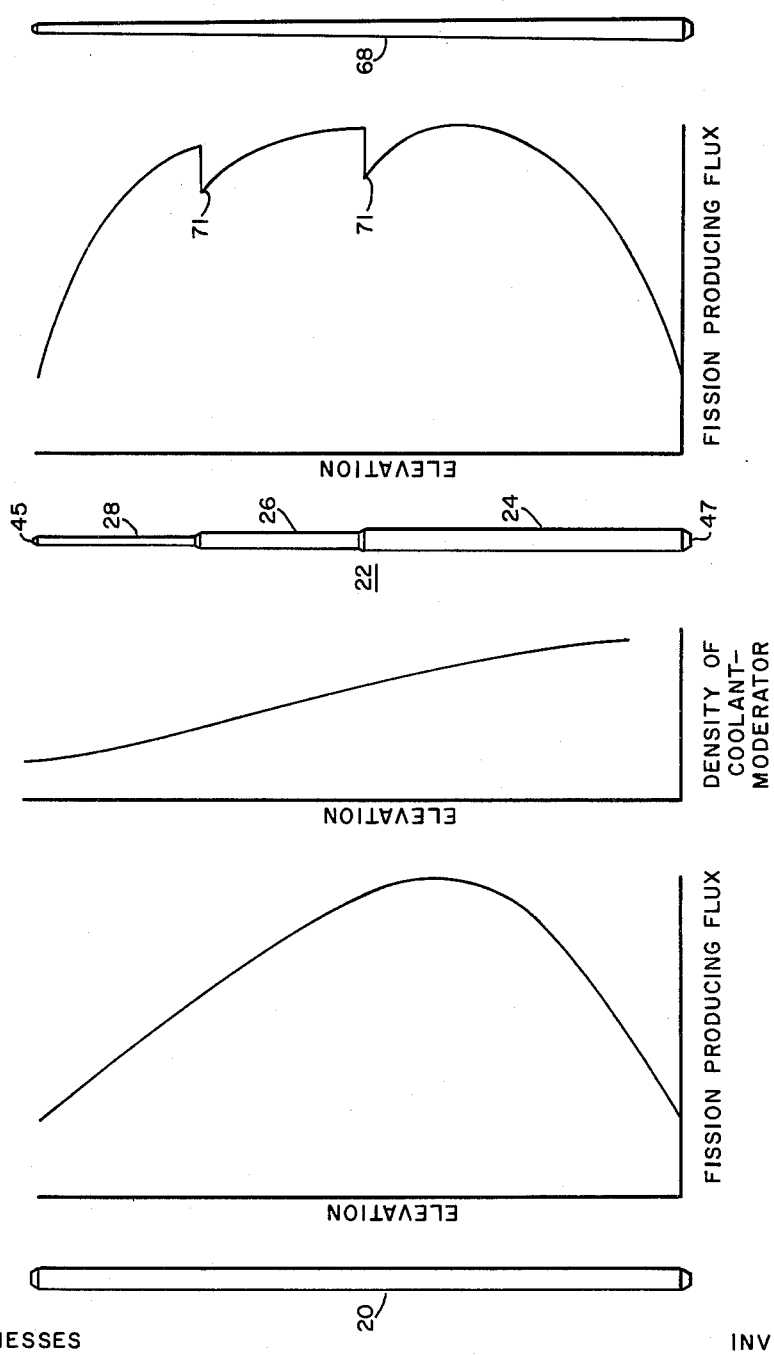

3,211,627
FUEL ELEMENT FOR A COOLANT-MODERATOR NUCLEAR REACTOR
Arthur G. Thorp II, Churchill Boro, Pa., assignor to Westinghouse Electric Corporation, East Pittsburgh, Pa., a corporation of Pennsylvania
Filed Feb. 5, 1962, Ser. No. 170,993
4 Claims. (Cl. 176—76)

The present invention relates to nuclear reactors and more particularly to fuel elements for use in such reactors.

In determining the manner in which a given fuel inventory is to be distributed throughout the reactive region or core of a heterogeneous power reactor (in particular one in which an array of parallel elongated fuel elements is employed), numerous operational objectives must be employed as guideposts. Of these, flattening of the axial fission-producing neutron flux distribution, consistently with attainment of other objectives such as heat transfer, nuclear control, etc., is a significant one.

Thus, there are various advantages gained through production of a relatively flattened axial distribution of fission-producing neutron flux. For example, the power density is then flattened along the length of the core and this leads to a longer or more efficient operating life of the core and to a minimization of the fuel inventory as well as more uniform burnup of the same.

In a given reactor, deviation of the flux distribution from flattened character can be traced to a number of sources, for example the fringe core geometry and the extent to which control rods are inserted. In the specific case of the boiling heterogeneous reactor, employing water or other coolant-moderator, another of these sources is the fact that boiling of the coolant-moderator markedly varies its density over the core, particularly since actual "voids" are produced with the coolant-moderator volume. The variation of this density over the core length in turn produces a similar variation in the moderating effect of the coolant-moderator and therefore a variation in the fission-producing neutron flux along the core length.

In a boiling heterogeneous reactor, for example, the result is that a significant portion of the total deviation of the axial flux distribution from flatness is attributable to the pronounced variation of coolant-moderator density over the core length. Compensation for this portion of the deviation, that is the portion produced by the variation in coolant-moderator density, provides on substantial meansure the advantages outlined above. One means for producing such compensation is to vary the cross-section of the fuel elements as well as the amount of fuel over the core length in such a manner as to effect a moderator-fuel ratio so valued over the core length as substantially to account for the variation in moderator density and thereby substantially cancel the effect of the latter on axial flux distribution.

More generally, in coolant-moderator heterogeneous reactors, especially non-boiling ones, compensation also desirably is provided for non-flattening effects resulting from the fringe core geometry, namely the attenuation of flux adjacent the outer or upper and lower boundaries of the core. Such compensation can be provided by varying the cross-section of the fuel elements as well as the amount of fuel over the core length in such a manner as to effect an increased moderator-fuel ratio, and increased fission-producing flux in turn, adjacent the upper and lower ends of the core.

Accordingly, it is an object of the invention to provide a novel elongated fuel element so formed structurally as to have a varying cross-section and a varying amount of fuel over its length.

Another object of the invention is to provide a novel fuel element as described in the first object, wherein the element comprises a plurality of elongated cladded fuel segments of varying cross-section and means for securing the segments together in end-to-end relation.

A further object of the invention is to provide a novel fuel element as described in the preceding object, wherein the thickness of the cladding of the segments is provided generally in proportion to the cross sectional size of the segments.

An additional object of the invention is to provide a novel fuel element as described in the first object, wherein the fuel cladding is integral over the fuel element length.

Another object of the invention is to provide a novel fuel element as described in the first object, wherein the fuel element is provided with an integral cladding member over its entire length and wherein the cladding member is tapered along its length to provide a varying cross-section and a varying amount of fuel over the length of the fuel element.

These and other objects of the invention will become more apparent upon consideration of the following detailed description along with the attached drawings, in which:

FIG. 1 shows a curve representing the variation in moderator density as a function of longitudinal or elevational position along a fuel element in a conventional boiling water reactor;

FIG. 2A is an elevational view of an ordinary fuel element for use in the boiling water reactor related to FIG. 1;

FIG. 2B shows a curve representing the variation in fission-producing neutron flux as a function of longitudinal position along the ordinary fuel element of FIG. 2A;

FIG. 3A is an elevational view of a fuel element constructed in accordance with the principles of the invention;

FIG. 3B shows a curve representing the variation in fission-producing neutron flux as a function of longitudinal position along the fuel element of FIG. 3A in a boiling water reactor;

FIG. 4 is an elevational view of another fuel element constructed in accordance with the principles of the invention;

Figure 5:
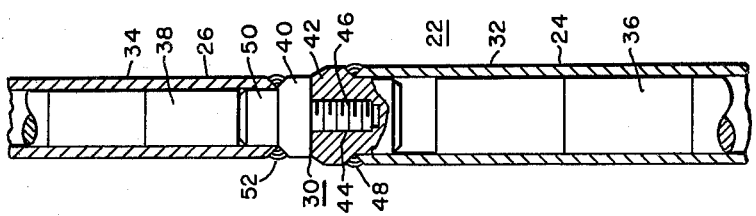
FIG. 5 is a partially sectioned fragmentary view of a fuel element constructed in accordance with the principles of the invention.

In accordance with the broad principles of the invention, an elongated fuel element for use in a heterogeneous coolant-moderator reactor is formed with a varying cross-section and a varying amount of fuel along its length. The cross-section of the fuel element is made to vary in accordance with some function of one or more variables or parameters of the reactor system which would otherwise tend to vary the fission-producing flux throughout the reactor core. The variance in cross-section can be obtained by placing together in end-to-end relation a plurality of elongated fuel segments of differing cross-sections. The variance in cross-section can also be obtained in a continuous manner through the provision of a stepped or tapered integrally cladded fuel element. Where plural fuel segments are employed, means are provided for sealingly joining or securing successive segments together.

For the purpose of explaining the character of the present invention more specifically, reference is made to the well known type of fuel arrangement in which a plurality of parallel elongated fuel elements are supported upstandingly in an array between upper and lower core support plates. Further, in the referenced fuel arrangement, energy transfer from the fuel elements is accomplished through the use of a coolant-moderator which flows along and among the fuel elements. As a specific illustrative example, the design parameters of the reactor which includes the referenced fuel arrangement are assumed to be such that the coolant-moderator vaporizes or boils at least to some extent as it proceeds along the fuel elements. Accordingly, in this example, a relatively marked differential in the density of the coolant-moderator exists between its point of entry to the fuel arrangement and its point of exit from the fuel arrangement. Over the length of the fuel elements between these extreme points, the density of the coolant-moderator varies substantially continuously as a function of longitudinal or elevational position, and, more particularly, decreases substantially from the point of coolant-moderator entry to the point of coolant-moderator exit.

In FIGURE 1, there is shown a curve representing the variation in the density of coolant-moderator over the length of a fuel arrangement in the aforementioned exemplary boiling reactor. The longitudinal dimension of such a fuel arrangement is normally placed in the upstanding direction and therefore the ordinate in FIGURE 1 is characterized in dimensional units of elevation. In FIG. 2A, there is shown an ordinary elongated fuel element or rod 20 which is provided with a substantially uniform cross-section over its length. There is shown in FIG. 2B a curve representing the elevational distribution of fission-producing flux associated with the fuel rod 20 when it is used in a fuel arrangement comprising a plurality of the fuel rods 20. It is noted that substantial attenuation in fission-producing flux occurs along the upper half of the fuel rod 20 as a result of heating or boiling and the associated attenuation in coolant-moderator density shown in FIGURE 1. Further, substantial attenuation of fission-producing flux adjacent each end of the fuel rod 20 is the result of the previously noted fringe core geometry effects.

As a counter measure against either or both of these attenuating effects, the present invention comprises an elongated fuel element or rod which has a varying cross-section over its length so as to accommodate a varying amount of fuel over its length. More particularly, the cross-section of the fuel rod and the amount of fuel therein decreases with increasing elevation according to a prescribed pattern depending upon the overall design parameters of the reactor in which the fuel rod is to be used.

Thus, in FIG. 3A, there is shown a fuel element 22 arranged primarily to offset the non-flattening flux effects of boiling. The fuel element 22 comprises three cladded fuel segments 24, 26 and 28 and means for joining the segments 24, 26 and 28 together in end-to-end relation. The uppermost fuel segment 28 is of lesser cross-section and contains less fuel than the intermediate fuel segment 26, which, in turn, is of less cross-section and contains less fuel than the lowermost fuel segment 24. In FIG. 3B there is shown a curve representing the elevational distribution of fission-producing flux resulting with the use of the fuel element 22 in a boiling coolant-moderator reactor. Generally, the curve of FIG. 3B is more flattened than is the curve of FIG. 2B, and this is due to the fact that the decreasing cross-section of the fuel in the fuel element 22 relative to elevation produces more desirable fuel to coolant-moderator ratio as a function of elevation.

Figure 6:
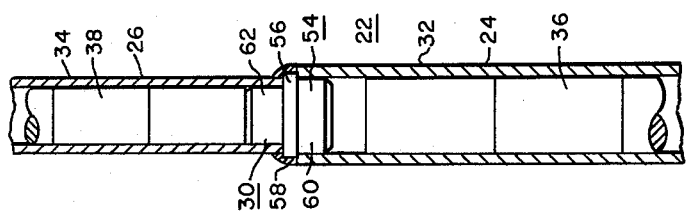
FIG. 6 is a partially sectioned fragmentary view of another fuel element constructed in accordance with the principles of the invention.
Figure 7:
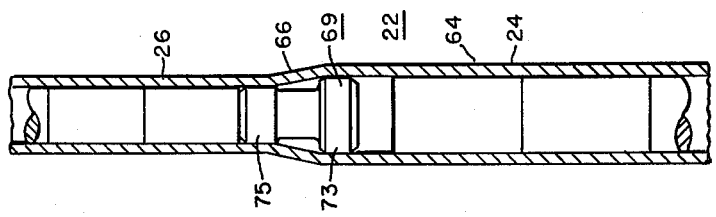
FIG. 7 is a partially sectioned fragmentary view of still another fuel element constructed in accordance with the principles of the invention.

In FIGS. 5–7, there are shown various means by which the fuel segments 24, 26 and 28 can be formed to produce the fuel element 22 in unitary form. Thus, in FIG. 5 there are shown means 30 for securing together the fuel segments 24 and 26 of the fuel rod 22. Similar means can be employed for securing together the fuel segments 26 and 28. It is to be noted that the fuel segment 24 or 26 includes a hollow cladding member 32 or 34 within which matingly sized fissile fuel means or pellets 36 or 38, of a suitable material such as uranium oxide, are positioned in tandem relation. Smaller pellets (not shown) can be provided for mating reception in the fuel segment 28 (FIG. 3A).

The securing means 30 comprise a bolt 40 and an end plug 42 having a threaded opening 44 into which a shank 46 of the bolt 40 is threaded. The end plug 42 also aids in sealing the interior of the fuel segment 24 and it is mated with and secured to the cladding member 32 for this purpose by any suitable means, for example by welding as indicated by the reference character 48. Similarly, the bolt 40, having an extension 50, is secured to the cladding member 34 of the fuel segment 26 for the purpose of sealing the interior of the same, and this also can be accomplished by any suitable means, for example by welding as indicated by the reference character 52. If desired, the bolt 40 can be staked (not shown) or otherwise positively secured in its tightened position relative to the end plug 42. Complete sealing is obtained when the fuel element 22 is fully assembled and end plugs 45 and 47 (FIG. 3A) are secured thereto.

The securing means 30 can also comprise a single plug 54 (FIG. 6) to join the fuel segments 24 and 26 or 26 and 28 in secured relation. The plug 54 is provided with a flange 56 which projects sufficiently outwardly to provide a securing surface or, more particularly, to provide a surface for strengthening a weld between the cladding members 32 and 34 as indicated by the reference character 58. The plug 54 includes a shoulder 60 which projects into the hollow of the cladding member 32 and a shoulder 62 which projects into the hollow of the cladding member 34. When the plug 54 is secured as described, the fuel segments 24 and 26 are rigidly and sealingly held together.

In FIG. 7, there is shown another embodiment of the invention in which the fuel element 22 comprises a single elongated cladding member 64 which is so formed as to include the respective fuel segments 24, 26 and 28. Thus, the cladding member 64 is provided with respective step portions 66 which divide the cladding member 64 into respective portions having differing cross-sectional sizes, namely the respective fuel segments 24, 26 and 28. Any suitable means, for example swaging, can be employed in forming the cladding member 66 as described. Fuel pellets of suitable respective sizes for location in the fuel segments 24, 26 and 28, are placed in the cladding member 64 through the larger end thereof, and one or more plugs 69 are used to segregate the fuel pellets into their respective fuel segments 24, 26 and 28. Each of the plugs 69 has differently sized shoulders 73 and 75 for mating securance to the cladding member 64 intermediately of each adjacent pair of segments, for example the segments 24 and 26, by any suitable means, for example by brazing. It is to be noted in connection with all of the forms of the fuel element 22 that a number of fuel segments greater or lesser than the number shown can be provided.

If it is desired to produce a continuous variation in the cross-section of a fuel element as a function of elevation, a tapered fuel element 68 can be employed (FIG. 4). A cladding member for the fuel element 68 can be tapered according to the desired pattern by any suitable means, for example by swaging. In this instance, it is presently impractical to utilize fuel in pellet form and therefore the use of powdered fuel within the cladding member of the fuel element 68 is presently to be preferred. The fuel element 68 also produces a generally flattened longitudinal distribution of fission-producing flux as described for the fuel element 22, but perturbations 71 observed in FIG. 3B would be removed.

In each of the embodiments of the invention, the cladding thickness can be reduced in proportion to the cross-sectional size of the fuel element 22 or 68 so as to lessen neutron absorption effects. Further, it is to be noted that the invention can be embodied for general usage, i.e.

in reactors other than boiling ones, so as to counter the fringe core geometry effects noted in the first part of this writing. Thus, as one example, a pair of fuel elements 22 or 68 placed in end-to-end mirror relationship, so as to be of decreasing cross-section adjacent and toward each end, can serve this purpose.

In the foregoing description, several fuel elements have been described to point out the principles of the invention. Accordingly, it is desired that the inveniton be not limited by the embodiments described, but, rather, that it be interpreted in accordance with the scope and spirit of its broad principles.

What is claimed is:

1. A fuel element for use in a coolant-moderator reactor, said fuel element comprising elongated hollow cladding means, fissile fuel means being suitably located within the hollow of said cladding means and in generally contiguous relation with the inner side of said cladding means, said cladding means comprising a plurality of elongated hollow cladding members of differing cross-sectional sizes, said fuel means being in the form of a plurality of suitably sized pellets located in each of said cladding members, means for securing said cladding members together in end-to-end relation so that the cross-sectional size of said fuel element decreases over its length, said securing means comprising a plug associated with each pair of adjacent cladding members, said plug having differently sized shoulders projecting respectively into the hollows of adjacent cladding members and closely fitted therein, and said plug having a flange projecting outwardly between the adjacent cladding members, and means for sealingly bonding said adjacent cladding members and said plug flange together.

2. The combination of claim 1 wherein each shoulder has a peripheral taper at its end and the thickness of each of said cladding members is generally in proportion to the cross-sectional size of the hollow of said cladding member.

3. A fuel element for use in a coolant-moderator reactor, said fuel element comprising elongated hollow cladding means, fissile fuel means being suitably located within the hollow of said cladding means and in generally contiguous relation with the inner side of said cladding means, said cladding means comprising a single hollow cladding member having a plurality of longitudinal portions of differing cross-sectional sizes, said fuel means being in the form of a plurality of suitably sized pellets located in each of said cladding portions, and means for retaining said pellets in their respective cladding portions, said retaining means comprising a plug located adjacent the junction of each pair of said cladding portions, each of said plugs having differently sized shoulders projecting respectively into the hollows of adjacent cladding portions, and means for sealingly bonding said adjacent cladding portions and said plug together.

4. A fuel element for use in a coolant-moderator reactor, said fuel element comprising elongated hollow cladding means, fissile fuel means suitably located within the hollow of said cladding means and in generally contiguous relation with the inner side of said cladding means, said cladding means comprising an integral hollow cladding member having a plurality of longitudinal portions of differing cross-sectional sizes, said fuel means being in the form of a plurality of suitably sized pellets located in each of said cladding portions, and means for retaining said pellets in their respective cladding portions, said retaining means comprising a plug located adjacent each junction between adjacent ones of said cladding portions, each of said plugs having differently sized shoulders inserted into and sized so as to be secured matingly to the respective associated cladding portions, said integral cladding member including a tapered portion disposed at each of said junctions and shaped so that the ends of each of said tapered portions closely engage respectively the shoulders of the associated plug.

References Cited by the Examiner

UNITED STATES PATENTS

| 2,849,387 | 8/58 | Brugmann | 176—76 |
| 2,849,388 | 8/58 | Brugmann | 176—74 |
| 2,982,712 | 5/61 | Heckman | 176—20 |
| 2,984,613 | 5/61 | Bassett | 176—68 |
| 2,998,367 | 8/61 | Untermyer | 176—56 |
| 3,015,616 | 1/62 | Sturtz et al. | 176—78 |
| 3,053,743 | 9/62 | Cain | 29—404 |

FOREIGN PATENTS

| 230,595 | 10/60 | Australia. |
| 1,241,339 | 8/60 | France. |

OTHER REFERENCES

Hausner et al.: Nuclear Fuel Elements, November 1959, page 29.

GER–1301: Dresden Nuclear Power Station, November 1956, pages 12 and 13.

CARL D. QUARFORTH, *Primary Examiner.*

OSCAR R. VERTIZ, REUBEN EPSTEIN, *Examiners.*